Sept. 8, 1970     J. C. ABROMAVAGE     3,527,075
COMBINATION CRIMPER AND TESTER

Filed Feb. 28, 1968     2 Sheets-Sheet 1

INVENTOR
JOHN C. ABROMAVAGE

BY *Semmes and Semmes*

ATTORNEYS

3,527,075
COMBINATION CRIMPER AND TESTER
John C. Abromavage, Tempe, Ariz., assignor to Arcoa, Incorporated, Phoenix, Ariz., a corporation of Oregon
Filed Feb. 28, 1968, Ser. No. 708,897
Int. Cl. B21c 51/00
U.S. Cl. 72—31      4 Claims

ABSTRACT OF THE DISCLOSURE

A combination crimper and tester, particularly a plier-like tool adapted for crimping a contacting clip about automobile tail light wiring and including a ground wire clip and indicator bulb which lights.

CROSS-REFERENCES TO RELATED APPLICATIONS

Combination Crimping and Testing Assembly (Ser. No. 640,715), filed May 23, 1967, issued as Pat. No. 3,464,246, on Sept. 2, 1969, wherein the crimping tool has a special flexible bracket for supporting a contacting clip prior to crimping.

In the present application the flexible bracket is eliminated and the crimping tool is constructed with a contacting clip configured hard crimping surface.

BACKGROUND OF THE INVENTION

Field of the invention

In the automobile trailer rental industry a particular problem is the adaptation of a trailer lighting system to the existing lighting system in the renter's towing vehicle. Conventionally, contacting clips are laboriously and uncertainly crimped around the existing tail light and braking wires in the automobile rear. Conventional pliers are not particularly suited to this purpose and there remains the difficulty of ascertaining which tail light or braking light wire has been crimped.

A number of inventors have adapted special pliers for crimping of contacting clips. However, none have been suitably adapted to the crimping of contacting clips about a vehicle wiring system and none have enabled the instantaneous visual testing of the wire contacted.

Description of the prior art

Lamson (1,460,970) teaches a plier-like hog ringing device, having special prong end depressions for engaging the ring.

Atkinson (1,678,313) battery tool has a special prong end for engaging the battery terminal post 12 for removal of the conductor clamps.

Garland (2,598,901) has devised a pair of pincers for crimping a deformable clamp about a blood vessel or tubular element. Garland's is principally a surgical tool and there is no suggestion of using any electrical wiring with or without a testing system.

Wallshein (2,755,692) is a dental tool for use by orthodontists in crimping of dental wire.

SUMMARY OF THE INVENTION

According to the present invention the dual function of crimping contacting clips about automobile wire and simultaneous testing of the wire is accomplished by a plier-like device, having a bracket configured as a support and crimping surface for the contacting clip, a ground wire clip and signaling bulb. As the particular automobile tail light or braking light wire is clipped, for example, depression of the brake or turning of the automobile turn indicator results in a flashing of the bulb, confirming the identity of the crimped wire and assuring the proper contact in the trailer lighting system.

DESCRIPTION OF THE PREFERRED EMBODIMENTS

Figures 1, 2:
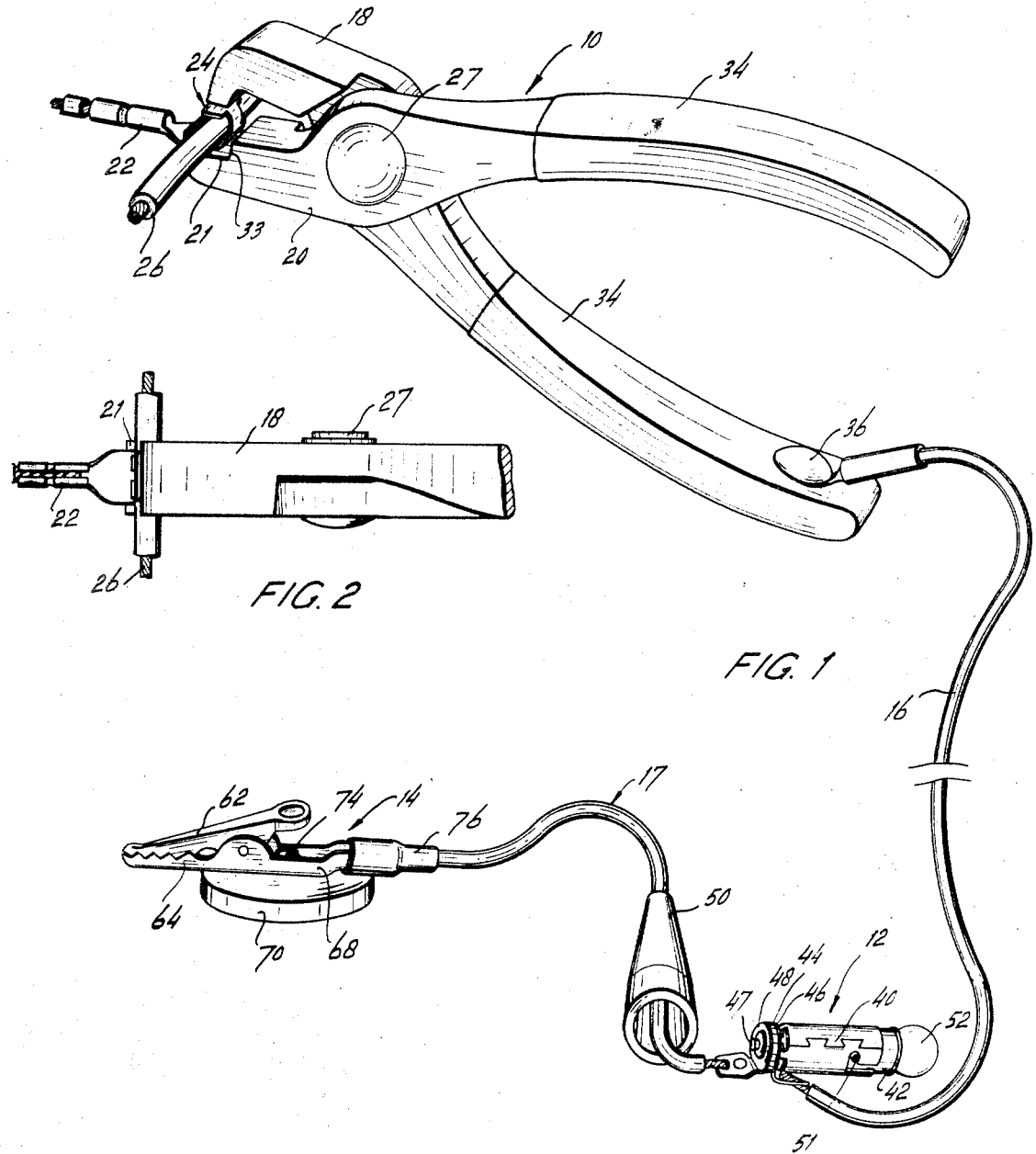
FIG. 1 is a perspective view of the combination crimper and tester, showing the plier-like device crimping the contacting clip about wire 26.
FIG. 2 is a fragmentary top plan.

As seen in FIG. 1, the present invention consists generally of crimping tool 10, cartridge-type bulb assembly 12 and magnetized clip assembly 14, appropriately connected by insulated wires 16 and 17.

Figure 3:
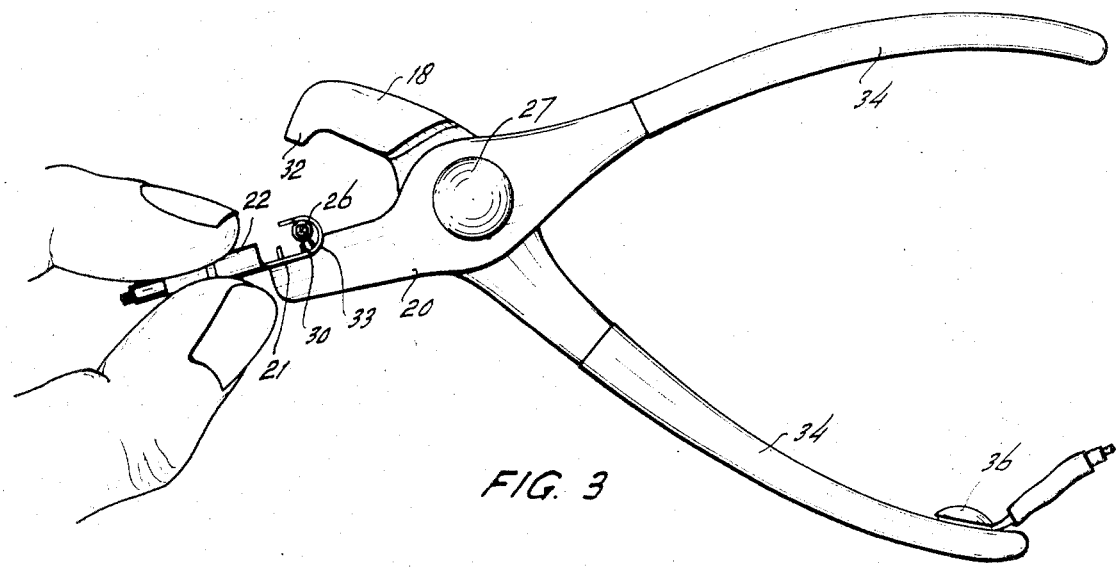
FIG. 3 is a side elevation (partially in section) showing the contacting clip 24 positioned upon the bracket prior to crimping in jaws-open position.
Figure 4:
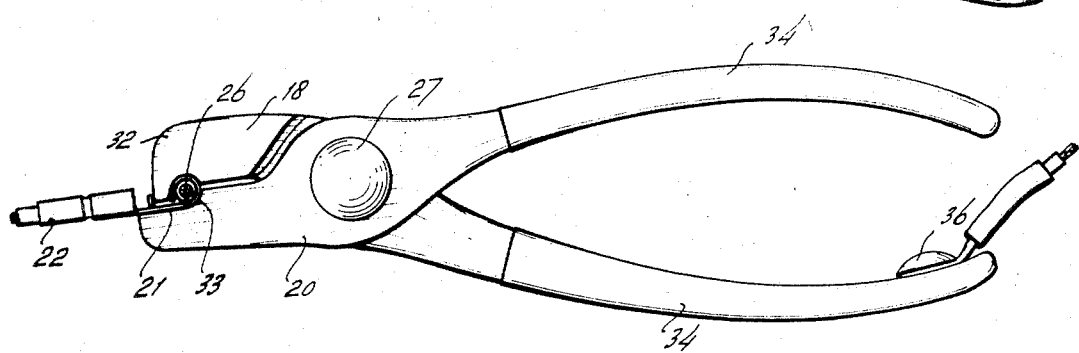
FIG. 4 is a side elevation, partially in section in jaws-closed position, showing the contacting clip 24 crimped into wire 26 by means of closing of the downwardly extending flat portion against the shelf in the bracket.
Figure 5:
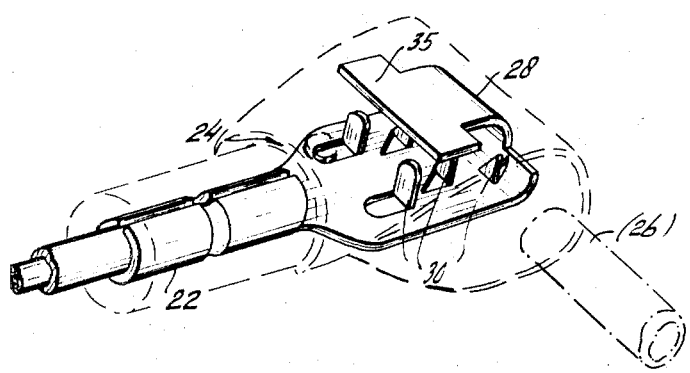
FIG. 5 is an enlarged perspective view of a conventional contacting clip, showing flat top 35 and contacting prongs 30.

More particularly, crimping tool 10 generally resembles a pair of pliers with handles 18 and 20 connected in pivoting relationship about rivet 27. Outer horizontal shelf 21 and inner vertical shoulder 33 in handle 20 are designed to hold the contacting clips 24. As a contacting clip 24 is inserted in handle 20 shelf 21, as seen in FIG. 3, and the desired insulated wire 26 positioned within U-shaped head 28, wire 26 will be forced into electrical contact with prongs 30, as seen in FIGS. 4 and 5, as head 32 of handle 18 presses that face 35 of head 28 inwardly under conventional "pliers" action against clip vertical shoulder 28 and shoulder 33 in handle 20. As will now be apparent, ease in crimping is assured as contacting shank 22 is securely held by the operator's forefinger and thumb during the entire crimping operation.

As is well known, in attempting to crimp wires in close quarters the wires are frequently hard to grab hold of and the crimping clips difficult to fold or bend over wires by means of conventional pliers. With the present invention, however, it is only necessary to insert a contacting clip 24 over wire 26 and pinch head 28, after which pressure on handles 18 and 20 is released, leaving clip 24 about the wire 26 desired to be contacted.

Wire 16, the function of which will be explained in detail hereinafter, is attached to handle 20 at any conventional juncture 36. Finally, handles 18 and 20 are provided with an optional coating 34 of insulation.

Clip 14 is of the "alligator" type having opposed sets of teeth 62 and 64 urged into engaging relationship by a torsion spring not illustrated. Attached to arm 68 is support 70 within which is mounted magnet 72 at a juncture 74. Wire 17 is connected conventionally to clip 14 and may be covered by insulating sleeve 76.

Of course, bulb and clip assemblies 12 and 14 permit testing for continuity in combination with the crimping function of tool 10. For example, if an automobile turn signal indicator is turned on or the brakes depressed while the tool of the present invention is engaging a selected wire 26, it is possible for the operator to instantly determine which of these wiring systems has been clipped.

Bulb assembly 12 includes bulb housing 40 supporting bulb casing 42 and bulb 52 by bayonet type compression assembly 51. Wire 16 terminal 46 and wire 17 terminal 48 are secured to contact 47 having medial installation disc 44. A rubber cover 50 may be provided for covering housing 40 and the terminals 46 and 48.

Manifestly, the plier-pinching portions, as well as the bracket configuration may be varied without departing from the spirit of invention.

I claim:
1. A combination crimping and testing assembly for use with contacting clips, comprising:
   (A) a crimping tool including:
      (i) two handles connected in pivoting relationship;
      (ii) a bracket configured as a support for the contacting clip and having an outer horizontal shelf and an inner vertical shoulder at the end of one of said handles and being generally complementary in configuration with respect to the contacting clips, while the other of said handles terminates in a downwardly extending flat end portion disposed opposite said shoulder and generally perpendicular to said shelf and parallel to said shoulder, as said handles are brought together for crimping said contacting clip about a wire.

2. A combination crimping and testing assembly as in claim 1, said downwardly extending flat portion being longitudinally offset with respect to said vertical shoulder and overlapping said shoulder in handles closed position.

3. A combination crimping and testing assembly as in claim 2, wherein said resilient clip includes a magnet assembly attached thereto.

4. A combination crimping and testing assembly as in claim 3, including electrical insulation on said handles of said tool.

References Cited

UNITED STATES PATENTS 3,327,374   6/1967   Lulick et al. _____ 29—203

CHARLES W. LANHAM, Primary Examiner

M. J. KEENAN, Assistant Examiner

U.S. Cl. X.R.

29—407; 72—410